(12) United States Patent
Tartler

(10) Patent No.: US 10,717,058 B2
(45) Date of Patent: Jul. 21, 2020

(54) DEVICE FOR MIXING AT LEAST TWO FLUID COMPONENTS, ROTATIONALLY-DRIVEN MIXER INSERT THEREFOR, AND SYSTEM OF THE TWO

(71) Applicant: Udo Tartler, Lutzelbach/Haingrund (DE)

(72) Inventor: Udo Tartler, Lutzelbach/Haingrund (DE)

(*) Notice: Subject to any disclaimer, the term of this patent is extended or adjusted under 35 U.S.C. 154(b) by 59 days.

(21) Appl. No.: 15/921,503

(22) Filed: Mar. 14, 2018

(65) Prior Publication Data

US 2018/0304211 A1 Oct. 25, 2018

Related U.S. Application Data

(63) Continuation of application No. 14/382,388, filed as application No. PCT/EP2013/000601 on Mar. 1, 2013, now abandoned.

(30) Foreign Application Priority Data

Mar. 2, 2012 (DE) .................. 10 201 2004 056

(51) Int. Cl.
*B01F 7/00* (2006.01)
*B01F 15/00* (2006.01)
(Continued)

(52) U.S. Cl.
CPC .......... *B01F 7/002* (2013.01); *B01F 7/00408* (2013.01); *B01F 7/00725* (2013.01);
(Continued)

(58) Field of Classification Search
CPC ........ B01F 7/002; B01F 7/00725; B01F 7/16; B01F 7/1605; B01F 15/0048;
(Continued)

(56) References Cited

U.S. PATENT DOCUMENTS 2,592,709 A * 4/1952 Kinnaird .................. A23G 9/16
366/169.1
3,042,264 A * 7/1962 Trumbuil .................. B29B 7/38
222/142
(Continued)

*Primary Examiner* — Joseph W Drodge
(74) *Attorney, Agent, or Firm* — White & Case LLP

(57) ABSTRACT

The invention relates to a mixer insert having a support rod element and at least one vortexing element and a rotary drive connection structure, wherein the mixer insert, for insertion into a tubular passage element, and together therewith, is adapted to a device for mixing at least two fluid components to be placeable by means of the rotary-drive connection structure in drive connection with a driveshaft of the device, when the mixer insert is inserted into the passage element and the passage element is placed in fluid-tight flow connection with at least two component feed lines of the device, characterized in that the rotary-drive connection structure has a bore hole having a bore hole wall which are adapted to a thread on the driveshaft in such a manner that the bore hole, for producing the drive connection, can be screwed onto the thread, wherein the bore hole wall is shaped by the thread. The invention also relates to such a device for mixing and also to a system of such a device and such a mixer insert.

8 Claims, 2 Drawing Sheets

Figure 2:
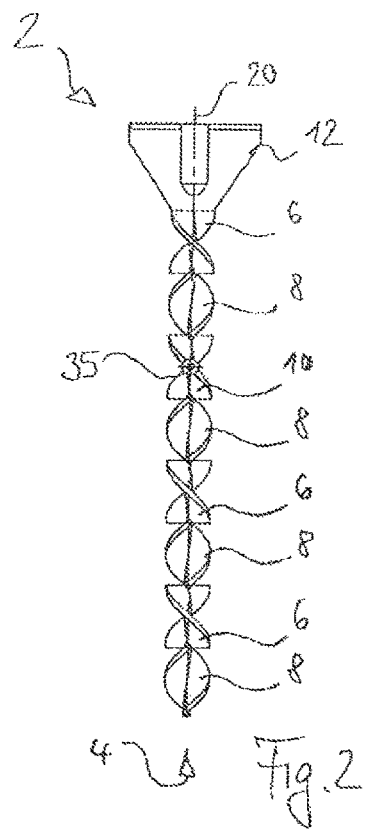

(51) Int. Cl.
*B29B 7/22* (2006.01)
*B29B 7/38* (2006.01)

(52) U.S. Cl.
CPC ...... *B01F 15/0048* (2013.01); *B01F 15/0087* (2013.01); *B01F 15/00733* (2013.01); *B29B 7/22* (2013.01); *B29B 7/38* (2013.01)

(58) Field of Classification Search
CPC .......... B01F 15/00662; B01F 15/00668; B01F 15/00681; B01F 15/00733; B01F 15/0087; B01F 15/00408; B01F 15/00391; B01F 15/00416; B01F 15/00541; B01F 15/02; B01F 15/0201; B01F 15/0203; B01F 15/0227; B01F 2015/00577; B01F 2015/00603; B01F 2015/00649; B01F 7/00408; B01F 7/15; B01F 7/0048; B01F 7/00662; B01F 7/00668; B01F 7/00681; B01F 7/00733; B01F 7/0087; B01F 7/00391; B01F 7/00416; B01F 7/00541; B01F 7/02; B01F 7/01; B01F 7/0203; B01F 7/0227; B01F 2015/0057; B01F 2015/0063; B01F 7/0201; B29B 7/22; B29B 7/24; B29B 7/38; B29B 7/39; B29B 7/40; B29B 7/42; B29B 7/421; B29B 7/44; B29B 7/586; B29B 7/76; B29B 7/7631; B29B 7/7636
USPC .... 366/69, 76.1, 78, 97, 100, 242, 244, 245, 366/247, 249, 251, 279, 292, 295, 325.1, 366/293; 264/310, 328.1, 328.6; 425/200, 205, 209
See application file for complete search history.

(56) References Cited

U.S. PATENT DOCUMENTS

| | | | | |
|---|---|---|---|---|
| 3,322,403 A | * | 5/1967 | Murphy | B01F 13/002 366/247 |
| 3,415,494 A | * | 12/1968 | Fisher | A23N 17/02 17/2 |
| 3,710,983 A | * | 1/1973 | Ricciardi | B01F 7/00408 222/141 |
| 5,071,040 A | * | 12/1991 | Laptewicz, Jr. | A61B 17/00491 222/235 |
| 5,193,908 A | * | 3/1993 | Rescorla | B01F 7/24 261/119.1 |
| 2003/0185098 A1 | * | 10/2003 | Koch | B01F 5/0475 366/336 |
| 2008/0175095 A1 | * | 7/2008 | Mott | B01F 7/1695 366/242 |

* cited by examiner

DEVICE FOR MIXING AT LEAST TWO FLUID COMPONENTS, ROTATIONALLY-DRIVEN MIXER INSERT THEREFOR, AND SYSTEM OF THE TWO

RELATED APPLICATIONS

This application is a continuation of U.S. application Ser. No. 14/382,388, filed Sep. 2, 2014 (now abandoned), which is a U.S. National Stage Entry of PCT Application No. PCT/EP2013/000601, filed Mar. 1, 2013, which claims the priority of German Application No. 10 2012 004 056.3, filed Mar. 2, 2012. Each of the foregoing applications is incorporated herein by reference in its entirety.

The present invention relates to a device for mixing at least two fluid components, as well as a mixer insert for such a device and a system of such a device and such a mixer insert. More precisely, the present invention relates to a mixer insert with a support rod element and at least one vortexing element and a rotary-drive connection structure, wherein the mixer insert, for insertion into a tubular passage element, and together therewith, is adapted to a device for mixing at least two fluid components, to be placeable by means of the rotary-drive connection structure in drive connection with a driveshaft of the device, when the mixer insert is inserted into the passage element and the passage element is placed in fluid-tight fow connection with at least two component feed lines of the device, as well as such a device for mixing at least two fluid components with at least two component feed lines and a rotary-drive with a driveshaft, wherein the device is adapted to place a tubular passage element in a fluid-tight connection with the component feed lines, and by means of a rotary-drive connection structure of a mixer insert, which has one support rod element and at least one vortexing element and which is adapted for insertion in the passage element, for placement with the mixer insert into a rotary-drive connection, when the mixer insert is inserted into the passage element and the passage element is placed in flow connection with the component feed lines.

For producing plastics, for example before passing the plastic into the sprue of a mold, at least two fluid components are mixed with one another in the case of some plastics, so that the resulting fluid or pasty mixture crosslinks and (optionally in the mold) "cures". Passing the plastic into the mold or, for example, also applying it onto a crossply laminate or fibrous tissue for producing GRP or CRP, takes place spread through a tubular passage element (mixer) with form elements (vortexing elements) in the interior thereof, which deflect, divert, locally dam, produce turbulences and/or vortex differently and thus thoroughly mix the liquid flowing through. As is well known, feed lines, especially in the number corresponding to the fluid components, of which the plastic is mixed, lead into this mixer.

Accordingly, mixing the components as late as possible, for example, before the plastic is passed into the mold or applied on the mat or fabric. For example, this also makes it possible to use a plastic with a short pot life, that is, a plastic, which crosslinks already shortly after being mixed and, as a result, quickly loses its rheological properties (viscosity), which it needs, for example, for filling the mold completely or impregnating the mat or fabric completely.

For mixing the components as uniformly and completely as possible, it has proven to be advantageous and become established to configure the vortexing elements so that they rotate in the tubular passage element.

Known devices for mixing at least two fluid components then have at least two component feed lines and a rotary-drive with a driveshaft, The device is then adapted for connecting a tubular passage element in a fluid-tight connection with the component feed lines and, by means of a rotary-drive connection structure of a mixer insert, (which has a support rod element with at least one vortexing element and which is adapted for insertion in the passage element) is placed in a rotary-drive connection with the mixer insert when the mixer insert is inserted into the passage element and the passage element is placed in flow connection with the component feed lines. For known mixer inserts, such a rotary-drive connection structure, in all likelihood, is an opening, which lies substantially radially to the axis of rotation and into which a hook at the end of the driveshaft is hooked, in order to bring about the drive connection. The mixer insert and the passage element may (also accordance to the invention) be single-use or disposable articles.

It is an object of the present invention to create a mixing device with a rotary-drive and a mixing insert therefor, as well as a system of the two, the handling of which is simplified.

This objective is accomplished by a mixer insert with the features of claim 1 or by a device for mixing with the features of claim 2 or by as system with the features of claim 2. Preferred developments are given in the dependent claims.

A mixer insert according to the invention has a support rod element with at least one vortexing element. Preferably, the support rod element is elongated and/or straight, especially cylindrical. Preferably, several vortexing elements are disposed around the preferably elongated support rod element. The mixer insert according to the invention is adapted for insertion in a tubular passage element of a mixing device, which is connected with at least two component feed lines in some indirect or direct line connection. In each case one fluid component can be passed through the component feed lines into and then through the tubular passage element. The mixer insert according to the invention is, for example, adapted so that, with its vortexing elements, it crosses at least one cross-section of the passage element (through which the component is flowing) or, with its vortexing elements, protrudes at least into one such cross-section of the passage element, when it is inserted into the latter. The flow of the fluids, flowing through there, is then diverted, deflected and/or locally dammed and turbulences are produced in the fluids, which are vortexed and, with that, thoroughly mixed. The support rod element functions preferably exclusively for the purpose of combining the vortexing elements into one component of the mixer insert and therefore need not necessarily, accordance to the invention, be "rod"-shaped, let alone cylindrical. In areas, where the vortexing elements adjoin one another directly, a support rod element need not even be identifiable at all, because the vortexing elements themselves can go over into one another directly. Accordingly, the concept of "support rod element" is to be understood in the widest sense accordance to the invention as any connecting element (or any connecting elements), even for transferring rotational movement, between the vortexing elements.

Moreover, in the sense according to the invention, fluids are defined as any flowable material in the widest sense, that is, not only as a liquid and/or gaseous material, but also as a grainy material, such as sand, or even a mixture, which is inhomogeneous with respect to particle size and/or material. Extremely viscous, "pasty" liquids are also fluids in the sense according to the invention. For this purpose also, devices are available, which can be used with the invention and produce flowing, highly viscous fluid, for example, by a suitably high pressure. It is also within the sense of the invention to mix fluids, which are not only of different materials, with the mixer insert. The at least two components may also be pairings of any of the different fluid natures described here, such as pairings of a liquid and a grainy component. From this, it also becomes clear that the mixer insert according to the invention can be used not only for mixing components for the production of plastics, but also for mixing any of the types of fluids defined here for any industrial purpose.

Moreover, the mixer insert according to the invention is adapted for being attachable to a rotary-drive of the mixing device. For this purpose, the mixer insert has a rotary-drive connection structure. Together with a tubular passage element, the mixer insert is then adapted to the device, namely, so as to be connectable, in a driving connection, by means of the rotary-drive connection structure with a driveshaft of a rotary-drive device of the device for mixing, when the mixer insert is inserted into the passage element and the passage element is placed in a fluid-tight connection with at least two components feed lines of the device. The mixer insert is then rotatable in the passage element and rotated by means of the driveshaft.

In turn, the device for mixing according to the invention is adapted to the insert of a so far described mixer insert also by using a so far described tubular passage element, in order to mix at least two fluid components by means of the device.

According to the invention, the rotary-drive connection structure of the mixer insert according to the invention has a borehole having a borehole wall, which are adapted to a thread on the driveshaft of the device for mixing, in such a manner that the borehole for producing the driving connection, can be screwed onto the thread, wherein the wall of the borehole is shaped by the thread.

In turn, according to the invention, the device for mixing according to the invention has on its driveshaft a thread, which is adapted to the rotary-drive connection structure of a mixer insert in the form of a borehole with a wall in such a manner, that the thread for producing the driving connection, can be screwed into the borehole, wherein the wall of the borehole is shaped by the thread.

In this connection, the axis of the borehole lies (at least substantially) in the direction of the intended axis of rotation of the mixer insert. Preferably, the thread is conical, for example, with an external diameter of 6 mm, corresponding with this diameter at least to the transition into the driveshaft, and of 3 mm at the driveshaft end, which is to be screwed into the borehole. These two diameters are, only for example, at a distance of 6 mm to 10 mm from one another. Preferably, the threads are adapted especially with respect to their cross-section, but also with respect to the depth and/or pitch of the threads, so that the thread is pressed and/or penetrates into the wall of the borehole, preferably, however, without cutting, that is, especially without removing material from the wall of the borehole.

Like the shaft, the thread moreover is made of metal, for example, of stainless steel, the borehole wall and, in particular, the whole of the mixer insert are, for example, made of polyoxymethylene (POM), but also from other plastics, which are suitable for the preferred production of the mixer insert by injection molding. Only for example, according to the invention, the thread can be screwed into the borehole by means of 2 to 3 rotations, either until, but also without the end of the thread finally coming up against a base of the borehole. Preferably, the thread and the rotary-drive of the device for mixing are adapted to one another so that the thread is screwed into the borehole in the same direction of rotation, in which the rotary-drive drives the mixer insert.

The handling, which this product according to the invention makes possible, speeds up not only the installation, but in particular also the dismantling of the mixer insert and of the passage element by hand. A mixing device according to the invention with a mixer insert according to the invention can be handled roboticly and CNC-controlled without additional, expensive tool-changing equipment. After all, the installation advantageously requires only the flush alignment of the axes of the driveshaft and of the borehole and then a rotational driving in the screwing-in direction with the number of rotations required for screwing in. The dismantling also advantageously requires a rotational driving, only in the direction opposite to the screwing-in direction with the same number of rotations required for the screwing in (or, in this case, even more rotations). In this way, plastic, which has hardened already around the mixer insert, is additionally and advantageously, possibly simply "blasted away" or torn off. Being a single-use or disposable parts, the mixer insert and the passage element can then be disposed of quickly.

The mixer insert according to the invention may have at least one section of the support rod element (preferably a longitudinal section in a longitudinal extension of the mixer insert or of the support rod element) without vortexing elements. This has turned out to be particularly effective for the thorough mixing of the components.

Preferably, the mixer insert according to the invention has at least one vortexing element, which is constructed as a fluid guide vane. The latter is then preferably shaped and/or aligned, so that it acts on the direction of flow of a fluid flowing by, so that at least one finite element of the flow flows spirally along the support rod element or around the support rod element.

Preferably, in the case of the mixer insert according to the invention (especially in an axial direction of the support rod element), respectively a section with guide vanes adjoins two mutually opposite sides of a section without guide vanes, the guide vanes being aligned to pass the fluid spirally in mutually opposite directions of rotation along the support rod element. Such two sections with guide vanes may also adjoin one another directly at the mixer insert according to the invention without there being a section without guide vanes in between.

Preferably, the mixer insert according to the invention is constructed with at least one section with vortexing elements, the section having at least two vortexing elements, which, protruding from the support rod element, are distributed uniformly on a periphery around the support rod element. If these are guide vanes, which are aligned for guiding fluid spirally along the support rod element, these at least two guide vanes may act on the flow in the same or in different spiral directions.

These and further advantages and features of the invention are described further by means of the following drawings of examples of the invention. In the drawings, FIG. 1 shows a spatial view of a mixer insert according to the invention, FIG. 2 shows a side view of the mixer insert according to the invention of FIG. 1, FIG. 3 shows a side view of the mixer insert according to the invention of FIGS. 1 and 2, which, in comparison to FIG. 2, is rotated by 90° around the longitudinal axis of the mixer insert and FIG. 4 shows a partially sectional view, in which the mixer insert according to the invention of FIGS. 1, 2 and 3 is inserted in a passage element of a mixer device according to the invention.

Figure 3:
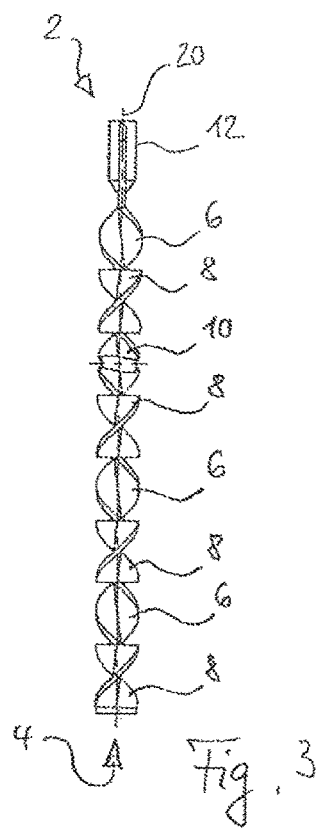
Figure 1:
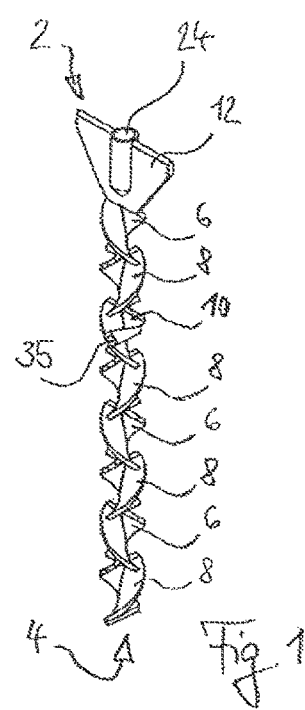
Figure 4:
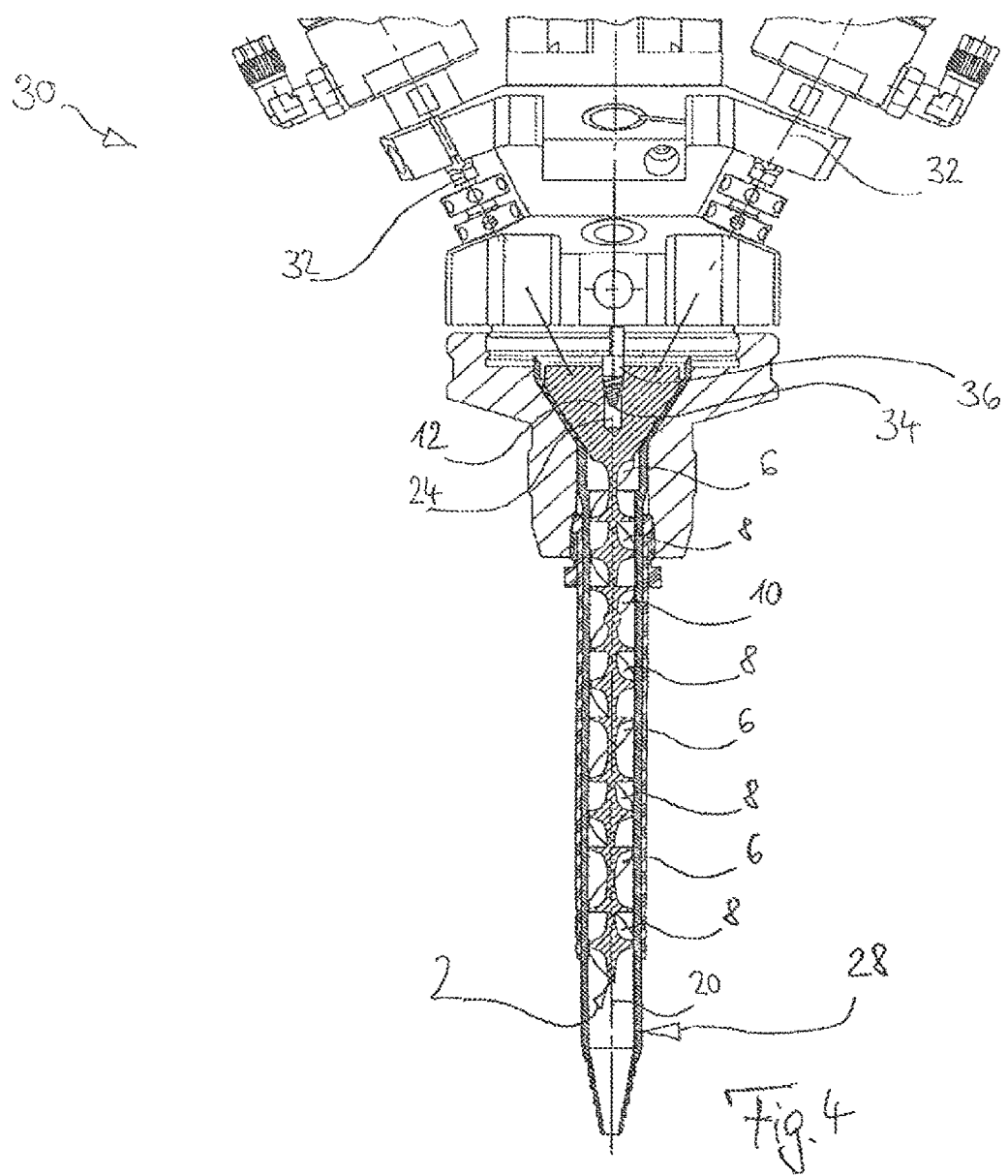

FIGS. 1 to 3 show a mixer insert 2. It has a support rod element 4 with vortexing elements 6 to 10, which are fastened firmly to the support rod element 4. The support rod element 4 and the vortexing elements 6 to 10 are constructed in one piece by an injection molding method, for example, from POM. The function of the support rod element 4 is to combine the vortexing elements 6 to 10 into the one component of the mixer insert 2. Actually, the support rod element 4 is not "rod" shaped. The support rod element 4 cannot even be recognized at all as a body, because the vortexing elements 6 to 10 themselves change over into one another directly. Accordingly, the concept of "support rod element" is to be understood as the structure 4, which functions as the connection for transferring the rotational movement between the vortexing elements 6 to 10.

The support rod element is elongated and straight and circularly cylindrical around an axis of rotation 20.

The vortexing elements 6 to 10 are disposed around the support rod element 4 in eight sections 6 to 10 in the axial direction (along the axis 20) of the support rod element 4. Each of the eight sections 6 to 10 has two vortexing elements, which, protruding in pairs from the support rod element 4, are distributed uniformly on the respective periphery around the support rod element (namely, twisted by 180° to one another around the axis 20).

The vortexing elements 6 to 10 are each constructed as a fluid guide vane. They are thus shaped and aligned so that they have a guiding effect on the direction of flow of the fluid flowing by and, moreover, in the example shown, so that stream filaments elements (not shown) of fluid flowing by (not shown) would be directed substantially spirally around the axis of rotation 20 along the support rod element 4.

If the mixer insert 2 would not be inserted (as described later in connection with FIG. 4) as a rotationally driven mixer (and, instead, were fastened in a stationary manner in a mixing device (not shown), past which then the fluid components, which are to be mixed, flow in the direction, in which the support rod element 4 extends), the guide vane elements 6 to 10 would bring about, in the manner just described, a spiral-shaped "twist direction" in the fluid of the components flowing by. In the following, the concept of "twisting direction" also refers to this spiral-shaped guidance.

However, according to the invention, the mixer insert 2 itself is also caused to rotate in the mixing device 30 (FIG. 4) around the direction, in which the support rod element 4 extends the vortexing elements 6 to 10 then acting less as guiding elements, as has been described up to now, and more as vane elements, which comb through the fluid components flowing by like turbine vanes.

The guide vanes vortexing elements of each of the eight sections 6 to 10, protruding in pairs from the support rod element 4, are both aligned so that they act together as a pair on the flow in the same spiral-shaped direction of twisting around the axis of rotation 20.

In FIGS. 1 to 3, in each case from top to bottom, the uppermost pair of guide vanes 6 guides the flow, arriving from above (not shown) initially in the upper guide vane-like section of a rotary-drive connection structure 12, extending parallel to the axis 20, straight ahead in the direction of the axis 20. Then, somewhat further below, the guide vanes 6 follow, so that they act together as a pair on the flow in the same spiral-shaped twisting direction (namely, viewed from above in FIGS. 1 to 3, counterclockwise) around the axis of rotation 20.

Below the uppermost pair of guide vanes 6, at the mixer insert 2 in FIGS. 1 to 3, viewed in each case from the top to the bottom, pairs of guide vanes 6 and 8 adjoin one another (in each case twisted by 90° relative to one another around the axis 20) and are aligned so that (when the mixer insert 2 (as described later on in connection with FIG. 4) is inserted as a "static" mixer) they would guide the fluid components flowing by in the direction of the support rod element 4 alternately clockwise (guide vanes 8) or counterclockwise (guide vanes 6) spirally around the support rod element 4.

The mixer insert 2 of FIGS. 1 to 3, due to its circular cylindrical outer contour, which is formed by the radial outer contours of the pairs of guide vanes 6 to 10, is adapted, according to FIG. 4, so that it can be inserted into a circular, cylindrical, tubular passage element 28 of a mixing device 30, which is in line connection with two component feed lines (each of which is shown diagrammatically only by its center lines 32). In each case one fluid component can be passed through the component feed lines 32 into the tubular passage element and then through this by means of a pump, which is not shown. The mixer insert 2 is adapted so that, along its longitudinal extent in the direction of the axis 20 in the section in each case of one of the guide vane pairs 6 to 10, it traverses (more precisely crosses—and, with these vortexing elements 6 to 10 in each case also protrudes into one such cross-section of the passage element) in each case a cross-section (through which the components flow) of the passage element with its vortexing elements 6 to 10. The fluids, flowing through there, are then diverted, deflected and/or locally dammed and turbulences are produced in the fluids, which are vortexed and, with that, thoroughly mixed.

Metal elements (not shown), which rotate along the outer wall of the tubular passage element 28 and so, by magnetic inquiry, enable the rpm and/or the rotation to be controlled, are pressed radially to the outside in the guide vane pair 10 into two small openings 35, which are oriented at 90° to the longitudinal axis 20.

According to FIG. 4, the mixer insert 2 is moreover also adapted, through a borehole 24 with a smooth wall 24 in the form of a circular cylinder, to be attachable in the passage element at a rotary-drive 36 (namely to be screwed onto a conical thread 34 at the lower end of a driveshaft 36), which drives the mixer insert 2 rotationally around the axis of rotation 20. The threads of the conical thread 34 are adapted especially in their cross section, but also in the depth and pitch of the thread, so that the thread 34 is impressed and or penetrates into the smooth wall of the borehole, without, at the same time cutting, that is, especially, without removing material from the borehole wall. The function of this is to produce the drive connection between the rotary-drive 36 of the mixing device 30 and the mixer insert 2.

The rotary-drive is thus prepared for driving the mixer insert around an axis of rotation 20, which extends in the longitudinal direction of the support rod element 4 and in the longitudinal direction of the support rod element in the support rod element. The rotational movement of the mixer insert 2 in the passage element intensifies the mixing additionally. In the case of "static" mixing (without rotational movement of the mixer insert 2), the guide vane-like vortexing elements 6 to 10 guide the fluid components flowing by (not shown) in the direction in which the support rod element 4 extends, clockwise or counterclockwise, spirally around the support rod element 4, vortexing them especially due to this change in direction. However, when they are driven rotationally as blade elements, they comb through the fluid components flowing through like turbine blades. Depending on the direction of inclination (clockwise or counterclockwise), they "transport" the fluid components further in the direction of flow, due to the propeller affect, through the tubular passage element 28 or act as a "damming element" against the direction of flow. In this way, mixing results at the vortexing blades 6 to 10 due to "pushing" or "damming".

The borehole axis 40 lies in the direction of the intended axis of rotation 20 of the mixer insert 2 and the driveshaft 36.

The invention claimed is:

1. A mixer insert arrangement with an elongated support rod element and at least one vortexing element and a rotary-drive connection structure at one end of the support rod element,
    wherein the mixer insert arrangement is inserted into an elongated tubular passage element, and together therewith, is prepared for coupling with a device for mixing at least two fluid components, with the rotary-drive connection structure prepared to be placed into a drive connection with a driveshaft of the device, wherein when the mixer insert is inserted into the passage element and the passage element is placed in fluid-tight connection with at least two component feed lines of the device,
    wherein the driveshaft is prepared to drive the mixer insert rotationally around an axis of rotation, which extends in the longitudinal direction of the support rod element, characterized in that the rotary-drive connection structure has a borehole with a borehole wall, which is located at the one end of the support rod element and orientated longitudinally and coaxially with the support rod element and its axis of rotation, and which is coupled to a thread on the end of the driveshaft, for producing the driving connection, in that the borehole is prepared to be screwed onto the thread, during which the borehole wall is shaped by the thread, because the thread imprints and/or impresses and/or pushes into the borehole wall.

2. The mixer insert according to claim 1, characterized in that the thread is conical.

3. The mixer insert according to claim 1, characterized in that the support rod element is straight and/or that several vortexing elements are disposed around the support rod element.

4. A device for mixing at least two fluid components having at least two component feed lines and a rotary-drive with a driveshaft,
    wherein the device is prepared to place a tubular, elongated passage element in a fluid-tight connection with the component feed lines, by means of a rotary-drive connection structure of a mixer insert, the insert further having one elongated support rod element and at least one vortexing element and being prepared for insertion into the passage element, to be brought into a rotary-drive connection with the mixer insert, when the mixer insert is inserted into the passage element and the passage element is placed in flow connection with the component feedlines, characterized in that the driveshaft has a threaded end, which, for producing the driving connection, is coupled to the rotary-drive connection structure, at one end of the support rod element of the mixer insert comprising a borehole with a wall, in that the thread is prepared to be screwed into the borehole for producing the driving connection, wherein during which the borehole wall is shaped by the thread, because the thread imprints and/or impresses and/or pushes into the borehole wall.

5. A system comprising:
    a mixer insert with an elongated support rod element and at least one vortexing element and a rotary-drive connection structure at one end of the support rod element, wherein the mixer insert is prepared for insertion into an elongated tubular passage element, and together therewith, is prepared for coupling with a device for mixing at least two fluid components, with the rotary-drive connection structure prepared to be placed into a drive connection with a driveshaft of the device, when the mixer insert is inserted into the passage element and the passage element is placed in fluid-tight connection with at least two component feed lines of the device, wherein the driveshaft is prepared to drive the mixer insert rotationally around an axis of rotation, which extends in the longitudinal direction of the support rod element, wherein the rotary-drive connection structure has a borehole with a borehole wall, which is located at the one of the support rod element and orientated longitudinally and coaxially with the support rod element and its axis of rotation, and which is coupled to a thread on the end of the driveshaft, for producing the driving connection such that the borehole is prepared to be screwed onto the thread, the borehole wall is being shaped by the thread, because the thread imprints and/or impresses and/or pushes into the borehole wall: and
    a device for mixing at least two fluid components, having at least two component feed lines and a rotary-drive with a driveshaft, wherein the device is prepared to place a tubular, elongated passage element in a fluid-tight connection with the component feed lines, and prepared by means of a rotary-drive connection structure of a mixer insert, which has the insert further having one elongated support rod element and at least one vortexing element and being prepared for insertion into the passage element to be brought with the mixer insert into a rotary-drive connection with the mixer insert, when the mixer insert is inserted into the passage element and the passage element is placed in flow connection with the component feed lines, characterized in that wherein the driveshaft has a threaded end, which, for producing the driving connection, is coupled to the rotary-drive connection connecting structure, at one end of the support rod element of the mixer insert in the form of comprising a borehole with a wall, in that the thread is prepared to be screwed into the borehole, for producing the driving connection, wherein the borehole wall is shaped by the thread, because the thread imprints and/or impresses and/or pushes into the borehole wall.

6. The mixer insert according to claim 5, characterized in that at least one of the vortexing elements is a fluid guide vane, which is aligned so as to guide the fluid spirally around the support rod element.

7. The mixer insert according to claim 6, characterized in that, in the axial direction of the support rod element at a section without guide vanes, two sections with at least one guide vane each adjoin, which are aligned for guiding fluid spirally in mutually opposite directions around the support rod element.

8. The mixer insert according to claim 6, characterized in that, in the axial direction of the support rod element, two sections with at least one guide vane each adjoin one another directly and are aligned for guiding fluid spirally in mutually opposite directions around the support rod element.

* * * * *